(12) United States Patent
Suzuki et al.

(10) Patent No.: US 8,931,373 B2
(45) Date of Patent: Jan. 13, 2015

(54) DRIVE-FORCE-DISTRIBUTION CONTROL DEVICE

(75) Inventors: Shinichi Suzuki, Kawasaki (JP); Daisuke Hiroi, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 200 days.

(21) Appl. No.: 13/806,595

(22) PCT Filed: Jul. 5, 2011

(86) PCT No.: PCT/JP2011/065387
§ 371 (c)(1),
(2), (4) Date: Dec. 21, 2012

(87) PCT Pub. No.: WO2012/005254
PCT Pub. Date: Jan. 12, 2012

(65) Prior Publication Data
US 2013/0098201 A1 Apr. 25, 2013

(30) Foreign Application Priority Data
Jul. 9, 2010 (JP) .................................. 2010-156658

(51) Int. Cl.
*F16H 37/06* (2006.01)
*F16H 48/19* (2012.01)
*B60K 17/02* (2006.01)
(Continued)

(52) U.S. Cl.
CPC ................ *F16H 37/06* (2013.01); *F16H 48/19* (2013.01); *B60K 17/02* (2013.01); *B60K 17/344* (2013.01); *B60K 23/04* (2013.01); *B60K 23/08* (2013.01); *B60K 23/0808* (2013.01);
(Continued)

(58) Field of Classification Search
USPC .............................................. 74/650, 665 GB
See application file for complete search history.

(56) References Cited

U.S. PATENT DOCUMENTS 3,308,682 A * 3/1967 Puidokas ........................ 74/607
4,261,219 A 4/1981 Suzuki et al.
(Continued)

FOREIGN PATENT DOCUMENTS

DE 19517955 A 11/1995
JP 54-172432 U 12/1979
(Continued)

OTHER PUBLICATIONS

An English translation of the Japanese Office Action for the corresponding Japanese patent application No. 2012-523881 issued on Nov. 19, 2013.
(Continued)

*Primary Examiner* — Ha D Ho
(74) *Attorney, Agent, or Firm* — Global IP Counselors, LLP (57) ABSTRACT

A drive-force-distribution control device includes an input-side bevel gear and an output-side bevel gear, a center shaft, left and right clutches, a housing, a bearing and a shim member. The output-side bevel gear is supported on the center shaft such that the output-side bevel gear meshes with the input-side bevel gear. The housing can be divided in the radial direction of the output-side bevel gear. The bearing is disposed at one end of the center shaft. The shim member is inserted in an axial-direction gap between the housing and the bearing. The output-side bevel gear and the center shaft can be attached to the housing from the radial direction. The axial end of the center shaft is located towards the other end with respect to the axial end of the bearing.

11 Claims, 4 Drawing Sheets

(51) Int. Cl.
  *B60K 17/344* (2006.01)
  *B60K 23/04* (2006.01)
  *B60K 23/08* (2006.01)
  *F16H 48/20* (2012.01)

(52) U.S. Cl.
  CPC .... *F16H 2048/205* (2013.01); *B60K 2023/043* (2013.01); *B60K 2023/085* (2013.01)
  USPC ........................................ 74/665 GB; 74/650

(56) References Cited

U.S. PATENT DOCUMENTS

| | | | |
|---|---|---|---|
| 4,530,667 A * | 7/1985 | McCormick | 440/75 |
| 4,821,602 A | 4/1989 | Yasui et al. | |
| 5,624,345 A | 4/1997 | Graft et al. | |
| 5,921,828 A * | 7/1999 | Ogino | 440/86 |

| | | | |
|---|---|---|---|
| 2004/0020325 A1 | 2/2004 | Krzesicki et al. | |

FOREIGN PATENT DOCUMENTS

| | | | |
|---|---|---|---|
| JP | 63-074558 | U | 5/1988 |
| JP | 63-74558 | U | 5/1988 |
| JP | 2-296039 | A | 12/1990 |
| JP | 4-124365 | U | 11/1992 |
| JP | 8-086344 | A | 4/1996 |
| JP | 3652462 | B | 5/2005 |
| JP | 2006-283780 | A | 10/2006 |

OTHER PUBLICATIONS

The extended European Search Report for the corresponding European Patent Application No. 11803588.0-1752 issued on Nov. 19, 2013.

* cited by examiner

DRIVE-FORCE-DISTRIBUTION CONTROL DEVICE

CROSS-REFERENCE TO RELATED APPLICATIONS

This application is a U.S. National stage application of International Application No. PCT/JP2011/065387, filed Jul. 5, 2011, which claims priority claims priority under to Japanese Patent Application No. 2010-156685, filed in Japan on Jul. 9, 2010, the entire contents of which is hereby incorporated by reference.

BACKGROUND

1. Field of the Invention

The present invention generally relates to a drive-force-distribution control device capable of distributing and outputting drive force to a left drive wheel and a right drive wheel.

2. Background Information

A drive-force-distribution device such as that described in, e.g., Japanese Patent No. 3,652,462 (FIGS. 2 and 4), has been proposed as a drive force distribution of the type noted above. This document has a drive bevel gear (hereinbelow described as "input-side bevel gear") driven by an engine, and a driven bevel gear (hereinbelow described as "output-side bevel gear") for meshing with this input-side hypoid gear. A clutch is disposed on the right and left sides of the output-side bevel gear, and a desired drive force is transmitted to the drive wheels. The output-side bevel gear is rotatably supported in a housing by ball bearings.

SUMMARY

However, a configuration for adjusting the meshing between the input-side bevel gear and the output-side bevel gear is not specifically described in the drive-force-distribution control device described in Japanese Patent No. 3,652,462, and adjusting the meshing is difficult. Thus, one object of the present invention is to provide a drive force distribution device capable of readily adjusting the meshing between the input-side bevel gear and the output-side bevel gear.

The drive-force-distribution control device of the present invention comprises: a center shaft having an output-side bevel gear for meshing with an input-side bevel gear; a housing capable of being divided in the radial direction of the output-side bevel gear, the output-side bevel gear and the center shaft capable of being mounted on the housing from the radial direction; a bearing disposed at a first end of the center shaft; and a shim member inserted into a gap in the axial direction between the housing and the bearing; the axially endmost part on the first end side of the center shaft being located further to the second end side than is the axially endmost part of the bearing on the first end side.

Therefore, the shim member can be mounted after the input-side bevel gear and the output-side bevel gear have been assembled into the housing from the radial direction, the center shaft is not required to be detached when the shim member is to be replaced, and assembly work is considerably improved.

BRIEF DESCRIPTION OF THE DRAWINGS

Referring now to the attached drawings which form a part of this original disclosure.

DETAILED DESCRIPTION OF THE EMBODIMENTS

Embodiments of the present invention are described in detail below with reference to the embodiments in the drawings.

Figure 1:
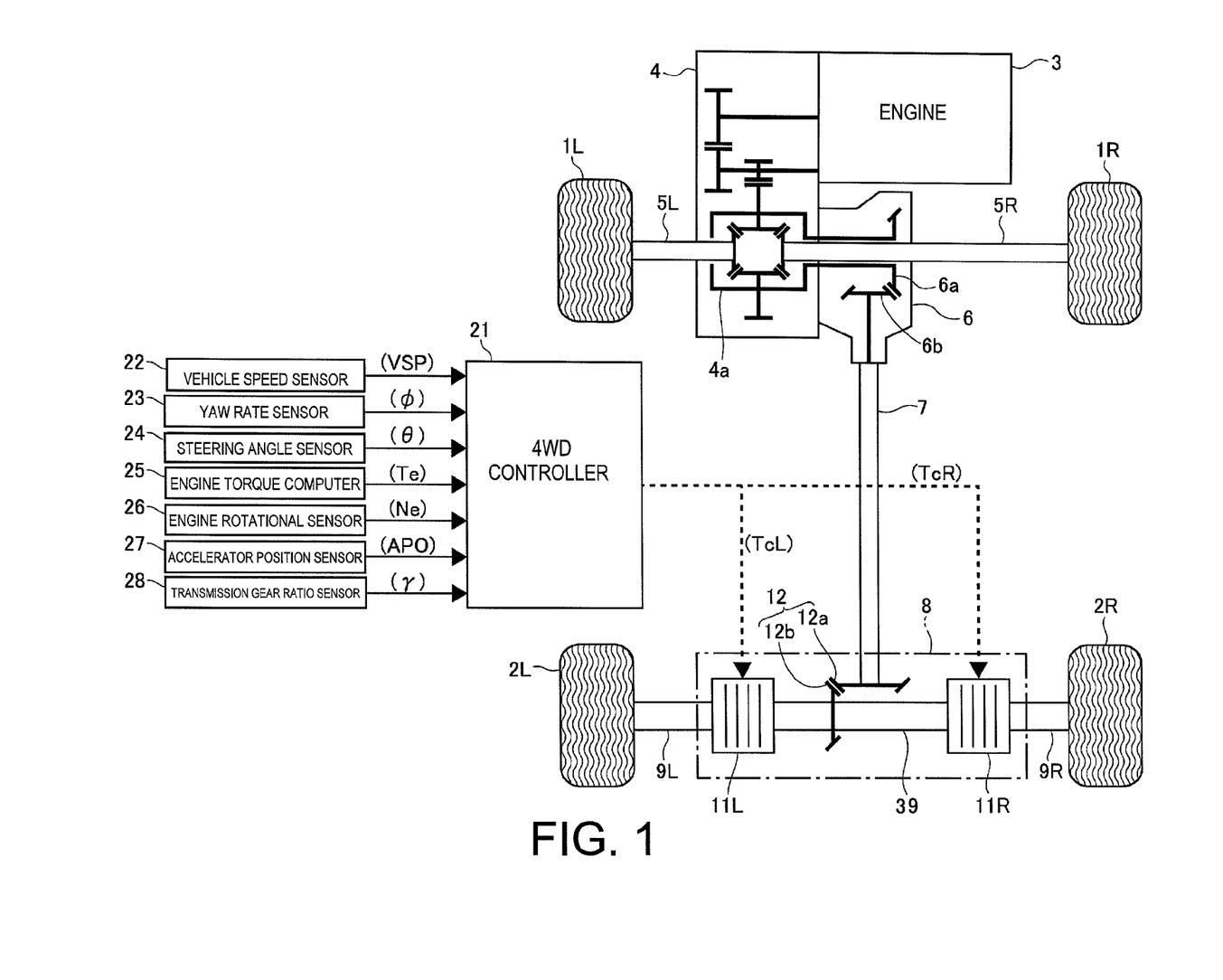
FIG. 1 is a schematic plan view of the wheel drive system of a four-wheel drive vehicle provided with the drive-force-distribution control device exemplifying the present invention as seen from above together with the four-wheel drive control system.

FIG. 1 is a schematic plan view of the wheel drive system of a four-wheel drive vehicle provided with the drive force distribution control of the first embodiment as seen from above together with the four-wheel drive control system. In the drawing, 1L and 1R show the left and right front wheels, respectively, as the main drive wheels, and 2L and 2R show the left and right rear wheels as the auxiliary wheels. In the present specification, the term "drive force" refers not to power, but rather to a "torque value."

The reference numeral 3 is an engine serving as a motor. The rotational power from the engine 3 is converted by a transmission (a transaxle including a differential gear device 4a) 4, the rotational power is directed to the left and right front wheels 1L, 1R via left and right axle shafts 5L, 5R, and the rotational power is provided to the driving of left and right front wheels 1L, 1R. A portion of the drive force directed to the left and right front wheels 1L, 1R converted by the transmission 4 is directionally changed by a transfer case 6 and directed to the left and right rear wheels 2L, 2R, and a transmission system therefor has a configuration such as described below. The transfer case 6 is provided with a bevel gear assembly composed of an input-side hypoid gear 6a and an output hypoid gear 6b. The transfer is not particularly limited to being provided with a hypoid gear, and may be provided with a bevel gear or another type of bevel wheel.

The input-side hypoid gear 6a is coupled to and rotates in accompaniment with a differential gear case, which is input rotation member of the differential gear device 4a. The front end of the propeller shaft 7 is coupled to the output hypoid gear 6b and the propeller shaft 7 extends rearward toward the left and right rear wheel drive force distribution unit 8. The transfer case 6 determines the gear ratio of the bevel gear assembly composed of the input hypoid gear 6a and the output hypoid gear 6b so that a portion of the drive force directed to the left and right front wheels 1L, 1R is outputted to the propeller shaft 7 at an increased speed.

The speed-increasing rotational power to the propeller shaft 7 is distributed and outputted to the left and right rear wheels 2L, 2R under later-described control of the left and right rear wheel drive force distribution unit 8. Accordingly, the left and right rear wheel drive force distribution unit 8 has a center shaft 39 disposed between the axle shafts 9L, 9R of the left and right rear wheels 2L, 2R and extending in the axial direction of the shafts 9L, 9R.

The left and right rear wheel drive force distribution unit 8 is provided with: a left rear wheel clutch 11L disposed between the center shaft 39 and the left rear wheel axle shaft 9L and used for coupling and controlling the shafts 39, 9L; and a right rear wheel clutch 11R disposed between the center shaft 39 and the right rear wheel axle shaft 9R and used for coupling and controlling the shafts 39, 9R.

The interval between the center shaft 39 and the rear end of the propeller shaft 7 extending from the transfer case 6 in the rearward direction of the vehicle is driveably coupled via a bevel gear-type final reduction gear 12 composed of an input-side hypoid gear 12a and an output hypoid gear 12b. The reduction ratio of the final reduction gear 12 is a gear ratio that causes a portion of the drive force directed to the left and right front wheels 1L, 1R to be directed in a speed-increasing fashion to the center shaft 39 in relation to the above-described speed-increasing gear ratio (speed-increasing gear ratio of the bevel gear assembly composed of the input hypoid gear 6a and the output hypoid-gear 6b) of the transfer case 6; and in the present embodiment, sets the total gear ratio of the transfer case 6 and the final reduction gear 12 so that the center shaft 39 is rotated with increased speed with respect to the left and right front wheels 1L, 1R.

Thus, the reason for determining the total gear ratio of the transfer case 6 and the final reduction gear 12 is described below. In the case that the center shaft 39 is not made to rotate with increasing speed, the rotational speed of the rear wheel 2L (or 2R) as the outer wheel of the left and right rear wheels 2L, 2R in a turn is higher than the rotational speed of the center shaft 39. In this state, when the clutch 11L (or 11R) is engaged on the rear wheel 2L (or 2R) side, which is the outer wheel of the turn direction, the high rotation speed of the rear wheel is restrained by the center shaft 39 rotating at low speed, and is reduced to the rotational speed of the center shaft 39. This means that the drive force cannot be transmitted from the center shaft 39 to the outer rear wheel 2L (or 2R) of the turn direction. As a result, the desired drive force distribution control becomes impossible to achieve, and undesirable consequences for four-wheel drive control are produced.

In view of the above, in the present embodiment, the total gear ratio of the transfer case 6 and the final reduction gear 12 is determined in the manner described above and the center shaft 39 is made to rotate with increased speed as described above so that drive force distribution control does not become impossible when the rotational speed of the center shaft 39 while traveling through the turn becomes less than the rotational speed of the outside rear wheel 2L (or 2R) in the turn direction. The increase in speed of the rotation of the center shaft 39 makes it possible to achieve the desired drive force distribution control, which is described below.

In the wheel drive system of the four-wheel drive vehicle described above, the rotational power from the engine 3 arrives at the left and right front wheels 1L, 1R having been reduced by the transmission (transaxle) 4, and drives the left and right front wheels 1L, 1R.

In this interval, a portion of the drive force directed to the left and right front wheels 1L, 1R arrives at the center shaft 39 from the transfer case 6 in sequence via the propeller shaft 7 and the final reduction gear 12; and the left and right rear wheels 2L, 2R are driven while the engaging force of the clutches 11L, 11R is controlled so that the clutches 11L, 11R slip by an amount commensurate to the increase in speed. The vehicle can thereby travel in four-wheel drive by the driving of the left and right front wheels 1L, 1R and the driving of the left and right rear wheels 2L, 2R. Therefore, the engaging force for the left rear wheel clutch 11L and the right rear wheel clutch 11R must be controlled in the four-wheel drive vehicle described above.

Furthermore, in order to improve the start performance and the acceleration performance of the vehicle in the four-wheel drive vehicle described above, the left and right wheel drive force distribution is controlled via the total engaging force control of the left rear wheel clutch 11L and the right rear wheel clutch 11R so that the front rear wheel drive force distribution can be controlled via the total engaging force control of the left rear wheel clutch 11L and the right rear wheel clutch 11R in order to control behavior so that turning performance of the vehicle is improved, and the actual behavior (actual yaw rate or the like) of the vehicle conforms to a target that corresponds to the travel conditions and/or the operational state of the vehicle. Accordingly, the engaging force control system of the left rear wheel clutch 11L and the right rear wheel clutch 11R is configured in the manner described below.

The left rear wheel clutch 11L and the right rear wheel clutch 11R are electromagnetic clutches in which the engaging force is determined in accordance with the supplied electric current, and the supply of electric current to the clutches 11L, 11R is electronically controlled so that the engaging force of the clutches 11L, 11R corresponds to target drive forces TcL, TcL of the left and right rear wheels 2L, 2R calculated by a four-wheel drive (4WD) controller 21 in the manner described below, whereby the front and rear wheel drive force distribution and the left and right wheel drive force distribution are controlled.

In order to compute the above-described target drive force TcL of the left rear wheel 2L and the target drive force TcR of the right rear wheel 2R, the 4WD controller 21 receives input of a signal from a vehicle speed sensor 22 for detecting the vehicle speed VSP, a signal from a yaw rate sensor 23 for detecting the yaw rate $\phi$ around the center of the vertical axis that passes through the center of gravity of the vehicle, a signal from a steering angle sensor 24 for detecting the steering angle $\theta$ of the steering wheel, a signal from an engine torque computer 25 for computing the output torque Te of the engine 3, a signal from the engine speed sensor 26 for detecting the engine speed Ne, a signal from the accelerator position sensor 27 for detecting the accelerator position APO, which is the amount of depression on the accelerator pedal, and a transmission gear ratio sensor 28 for detecting the gear ratio $\gamma$ currently selected by the transmission 4.

The 4WD controller 21 computes, on the basis of the inputted information, the left-side target drive force TcL and the right-side target drive force TcR for later-described front and rear wheel drive force distribution control and right and left wheel drive force distribution control. The engaging force (electric current) of the left rear wheel clutch 11L and the right rear wheel clutch 11R is electronically controlled so that the drive force of the left and right rear wheels 2L, 2R matches the target drive forces TcL, TcR.

Figure 2:
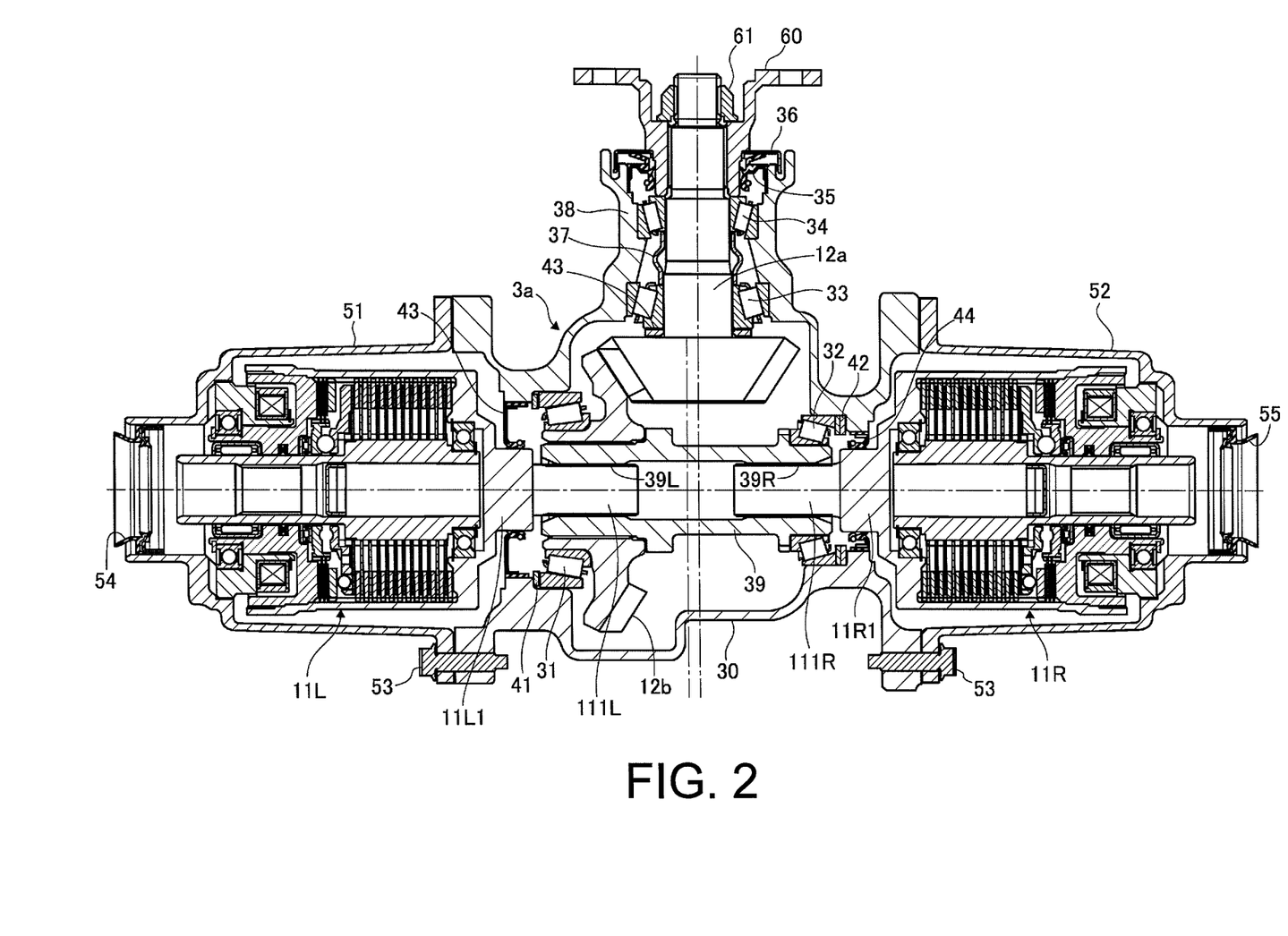
FIG. 2 is a cross-sectional view showing the configuration of the left/rear wheel drive force distribution unit of the first embodiment.

FIG. 2 is a cross-sectional view showing the configuration of the left/rear wheel drive force distribution unit of the first embodiment. The left and right rear wheel drive force distribution unit 8 has a center section housing 3a divided in the vertical direction along the axis of the input hypoid gear 12a of FIG. 2 and at the plane that passes through the axis of the center shaft 39. The center section housing 3a has the input hypoid gear 12a, a center section front housing 38 for accommodating a portion of the output hypoid gear 12b and the center shaft 39, and a center section rear housing 30 for accommodating a portion of the output hypoid gear 12b and the center shaft 39. The center section front housing 38 and the center section rear housing 30 is bisected into an upper side and a lower side along the axis of the input hypoid gear 12a, and is configured so that the center shaft 39 and the output hypoid gear 12b and the like can be assembled from the radial direction. The method for dividing the center section housing 3a is not necessarily required to be divided at the plane that passes through the axis of the center shaft 39, and it is also possible to use a configuration in which, e.g., the center section rear housing 30 opens in a fan shape that includes the center axis of the center shaft 39. In other words, it is possible to use a dividing method in which the housing is opened so as to allow the center shaft 39 to be assembled in the housing from the radial direction. The details are later described.

Substantially cup-shaped coupling housings 51, 52 for accommodating the left rear wheel clutch 11L and the right rear wheel clutch 11R are provided to the two sides of the center section housing 3a in the center shaft axial direction. The coupling housings 51, 52 are mounted using bolts 53 from the side in the axial direction of the center shaft of the center section housing 3a.

A front bearing 34 and a rear bearing 33 for rotatably supporting the input hypoid gear 12a, and a bearing spacer 37 for maintaining the interval between the front bearing 34 and the rear bearing 33, are disposed between the center section front housing 38 and the input hypoid gear 12a. The input hypoid gear 12a has a companion flange 60 coupled to the propeller shaft 7 on the vehicle front side, and a companion flange nut 61 for securing the input hypoid gear 12a and the companion flange 60. An oil seal 35 and a companion flange dust shield 36 for covering the oil seal 35 from the opening side of the center section front housing 38 are disposed between the companion flange 60 and the center section front housing 38.

The center shaft 39 is rotatably supported in the center section housing 3a via the bearings 31, 32. The output hypoid gear 12b is mounted by a spline fit on the center shaft 39. A left-side shim 41 for adjusting the position of the bearing 31 in the axial direction is mounted between the center section housing 3a and the outer side of the bearing 31 in the axial direction (the left side in FIG. 2). In likewise fashion, a right-side shim 42 for adjusting the position of the bearing 32 in the axial direction is mounted between the center section housing 3a and the outer side of the bearing 32 in the axial direction (the right side in FIG. 2).

The left-side shim 41 and the right-side shim 42 are annular plate members, and can be varied in thickness in the axial direction by using a plurality of thicknesses or a combination of a plurality of plate members. The positions of the bearing 31 and the bearing 32 in the axial direction are thereby adjusted, and the position of the center shaft 39 (the output hypoid gear 12b) in the axial direction is adjusted in accompaniment therewith. The meshing position between the input hypoid gear 12a and the output hypoid gear 12b is thereby adjusted, the torque transmission efficiency is improved, and the occurrence of abnormal noises is prevented or otherwise reduced.

The center shaft 39 is a hollow, substantially cylindrical member, and has shaft fitting parts 39L, 39R in which a spline has been formed in the inner circumference at both ends. Coupling input shafts 111L, 111R, which are integral with the left rear wheel clutch 11L and the right rear wheel clutch 11R from both sides in the axial direction and which have a spline in the outer circumference, are inserted from the axial direction, and the shaft fitting parts 39L, 39R mesh with the outer circumference of coupling input shafts 111L, 111R and are thereby coupled to the center shaft 39. Seating parts 11L1, 11R1 having a greater diameter than the coupling input shafts 111L, 111R are formed between the coupling input shafts 111L, 111R and the left rear wheel clutch 11L and the right rear wheel clutch 11R. Oil seals 43, 44 are mounted between the seating parts 11L1, 11R1 and the center section housing 3a. The parts for accommodating the left rear wheel clutch 11L and the right rear wheel clutch 11R are thereby made fluid-tight.

Figure 3:
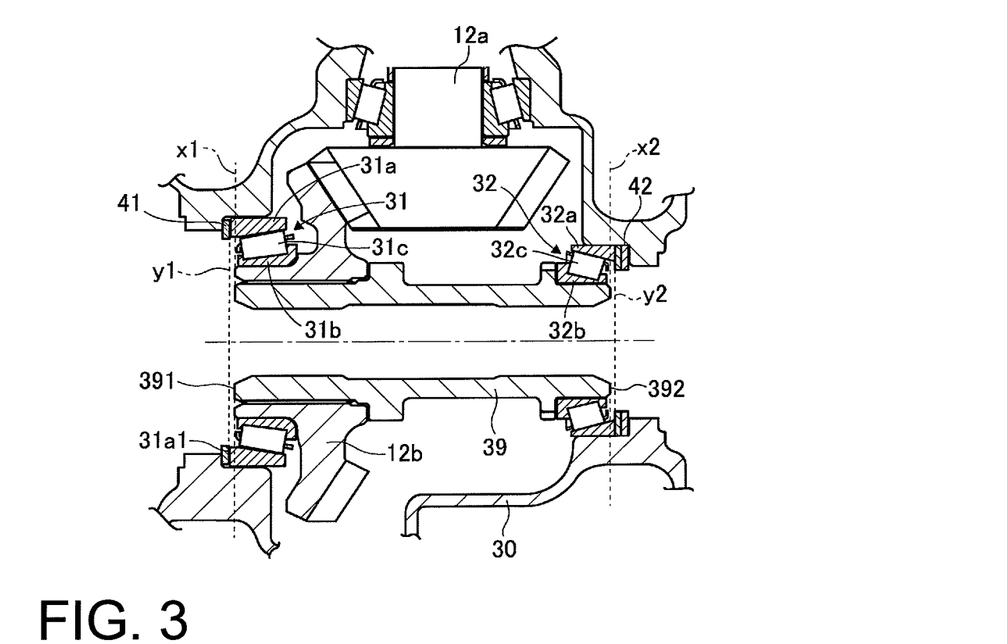
FIG. 3 is a partial enlarged cross-sectional view in the center shaft portion of the first embodiment.

Described next is the positional relationship between the center shaft 39, the left-side shim 41, and the right-side shim 42. FIG. 3 is a partial enlarged cross-sectional view in the center shaft portion of the first embodiment. The bearings 31, 32 for supporting the center shaft 39 are tapered roller bearings, and have outer races 31a, 32a in contact with the center section housing 3a, inner races 31b, 32b in contact with the output hypoid gear 12b (the center shaft 39), and roller bearings 31c, 32c for rolling between the race members. The tapered roller bearings have excellent function for providing rotatable support while bearing force in the axial direction, and have high functionality for positioning in the axial direction. When a hypoid gear is used as in the first embodiment, relative position (i.e., the meshing position) between the input hypoid gear 12a and the output hypoid gear 12b in the axial direction is very important from the aspect of torque transmission efficiency, durability, and other factors. In this case, the use of tapered roller bearings allows greater meshing precision to be achieved while force in the axial direction is firmly borne.

The left-side shim 41 and the right-side shim 42 for adjusting the positions of the outer races 31a, 32a in the axial direction are disposed between the center section housing 3a and the outer races 31a, 32a in the axial direction.

X1 is the position of the left-side end part 391 of the center shaft 39 in the axial direction (the endmost part in the axial direction at the left end of the center shaft 39) and X2 is the position of the right-side end part 392 (the endmost part in the axial direction at the right end of the center shaft 39). y1 is the right end position of the left-side shim 41 in the axial direction, i.e., the left end position of the outer race 31a in the axial direction; and y2 is the right end position of the right-side shim 42 in the axial direction, i.e., the right end position of the outer race 32a in the axial direction. Here, y1 is further than outside X1 (the left end-side of the bearing 32 and further to the right end-side than the endmost part in the axial direction) and y2 is further outside than X2 (the right end-side of the bearing 32 and further to the left end-side than the endmost part in the axial direction). In other words, the length of the center shaft 39 in the axial direction is set so as to be less than the length in the axial direction between the right-side shim 42 and the left-side shim 41 and so as to be contained between the right-side shim 42 and the left-side shim 41.

hypoid gearDescribed next is the step for assembling the hypoid gear. First, the portion of the center section front housing 38 in which the input hypoid gear 12a is accommodated is arranged on the lower side. The input hypoid gear 12a, the bearings 33, 34, and the like are assembled, and the center shaft 39 on which the bearings 31, 32, the output hypoid gear 12b, and the like have been mounted is assembled from the upper side, i.e., from the outer side of the center shaft 39 in the radial direction.

Next, the left-side shim 41 and the right-side shim 42 ("shims") is inserted between the center section front housing 38, and the bearing 31 and bearing 32. Here, the center shaft 39 is positioned further to the inner side in the axial direction than the left side of the outer race 31a of the bearing 31 and the right end of the outer race 32a of the bearing 32. Therefore, the two shims can be inserted and mounted from the radial direction even after the center shaft 39 has been mounted in the center section front housing 38. Shims having a predetermined thickness are inserted in advance during initial assembly.

Next, grease or the like for confirming the meshing state is coated between the tooth surface of the input hypoid gear 12a and the tooth surface of the output hypoid gear 12b, the center section rear housing 30 divided in the vertical direction is mounted, and the center section front housing 38 and the center section rear housing 30 are fastened and secured using bolts (not shown). In this state, the input hypoid gear 12a is caused to rotate under predetermined conditions and stopped.

Next, the center section rear housing 30 is removed, and it is determined whether the position of the center shaft 39 in the axial direction is optimum from the meshing marks left behind on the tooth surfaces of the input hypoid gear 12a and the output hypoid gear 12b. For example, when it is determined from the meshing marks that the position should be moved slightly to the right side in the axial direction, the left-side shim 41 is replaced with a thicker shim and the right-side shim 42 is replaced with a thinner shim. During this replacement, the center shaft 39 is positioned further inside in the axial direction than the left end of the outer race 31a of the bearing 31 and the right end of the outer race 32a of the bearing 32. Therefore, it is possible to remove, insert, and replace only the shims from the radial direction. In other words, it is possible to replace only the shims without removing the center shaft 39 from the center section front housing 38.

Figure 4:
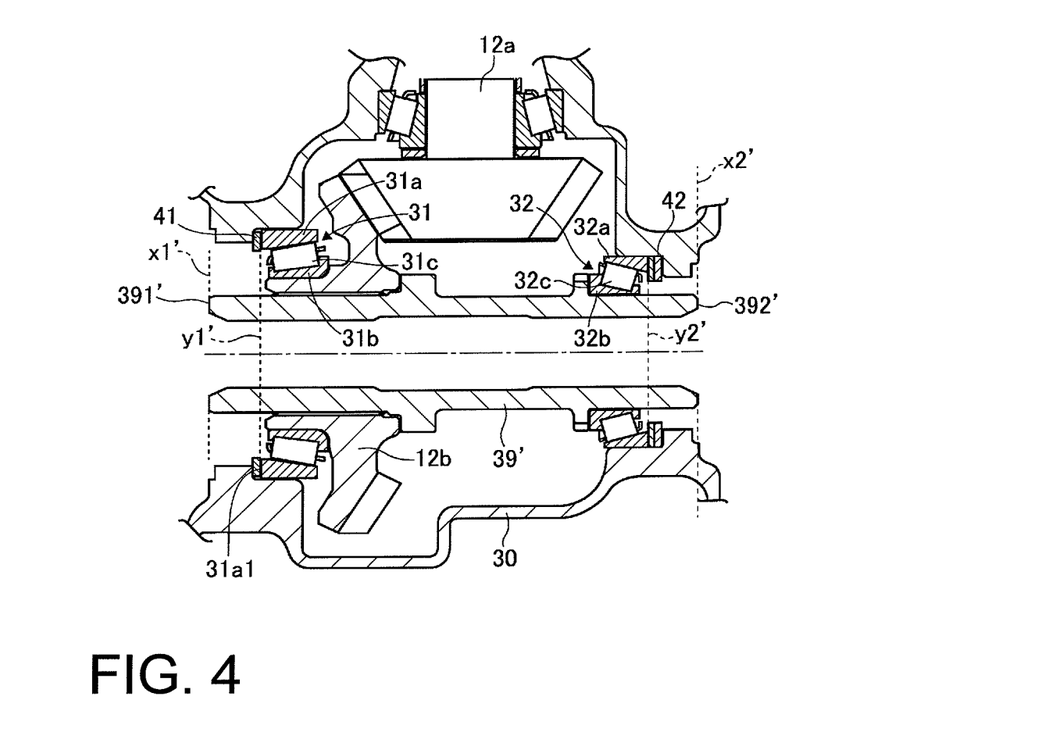
FIG. 4 is a partial enlarged cross-sectional view in the center shaft portion of a comparative example.

FIG. 4 is a partial enlarged cross-sectional view in the center shaft portion of a comparative example. This comparative example has the same basic configuration as the first embodiment, but the length of the center shaft 39' is different. In the comparative example, X1' is the position of the left-side end part 391' of the center shaft 39' in the axial direction, and X2' is the position of the right-side end part 392'. y1' is the right end position of the left-side shim 41 in the axial direction, i.e., the left end position of the outer race 31a in the axial direction; and y2' is the left end position of the right-side shim 42 in the axial direction, i.e., the right end position of the outer race 32a in the axial direction. Here, y1' is further than inside X1' and y2' is further inside than X2'. In other words, the length of the center shaft 39' in the axial direction is set so as to be greater than the length in the axial direction between the right-side shim 42 and the left-side shim 41.

In this case, when the left-side shim 41 and the right-side shim 42 are to be mounted, the shims must be mounted from the outer side of the center shaft 39' in the axial direction before the center shaft 39' is assembled into the center section front housing 38, and then center section front housing 38 is mounted. The shims are used for slightly adjusting the thickness, and the assembly work is laborious. Furthermore, when it has been determined after assembly that the shims must adjusted by replacement, and an attempt is made to remove only the shims, the shims catch on the center shaft 39' and cannot be removed. Therefore, work must again be carried out to remove the center shaft 39' from the center section front housing 38, and replace and reassemble the shims. As a result, the assembly work is laborious.

In contrast, according to the configuration in the first embodiment, the shims can be mounted after the center shaft 39 has been mounted in the center section front housing 38, the shims can be replaced without detaching the center shaft 39, and assembly work can be considerably improved.

Figure 5:
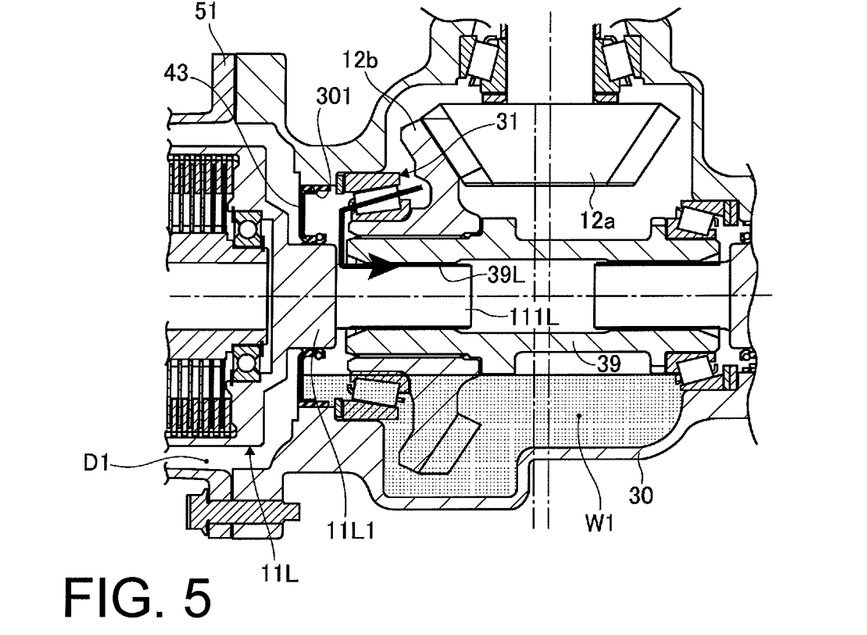
FIG. 5 is a partial enlarged cross-sectional view showing the vicinity the center shaft of the first embodiment.

(Described next is the lubrication effect in the vicinity of the center shaft. FIG. 5 is a partial enlarged cross-sectional view showing the vicinity of the center shaft of the first embodiment. The oil seal 43 is disposed on the inner circumference of the center section housing 3a and in a position further to the left rear wheel clutch 11L side than the bearing 31 to provide a seal with the seating 11L1. Since the configuration is the same on the right side, the description will focus on the left side.

Gear oil for lubricating the input hypoid gear 12a, the output hypoid gear 12b, and the like is introduced into the center section housing 3a to constitute a lubrication chamber W1. In contrast, the area in which the left rear wheel clutch 11L is accommodated constitutes a dry chamber D1 because the lubricating oil is sealed inside the left rear wheel clutch 11L. Here, the oil seal 43 is disposed between the center section housing 3a and the seating 11L1 of the left rear wheel clutch 11L, as shown in the first embodiment, and the lubricating oil drawn up by the rotation of the gears is also fed along the bearing 31 to the meshing portion between the center shaft 39 and the coupling input shaft 111L. In other words, lubricating oil can also be fed into the hollow portion of the center shaft 39, and abrasion with the spline in the meshing portion or other adverse events can be inhibited.

Figure 6:
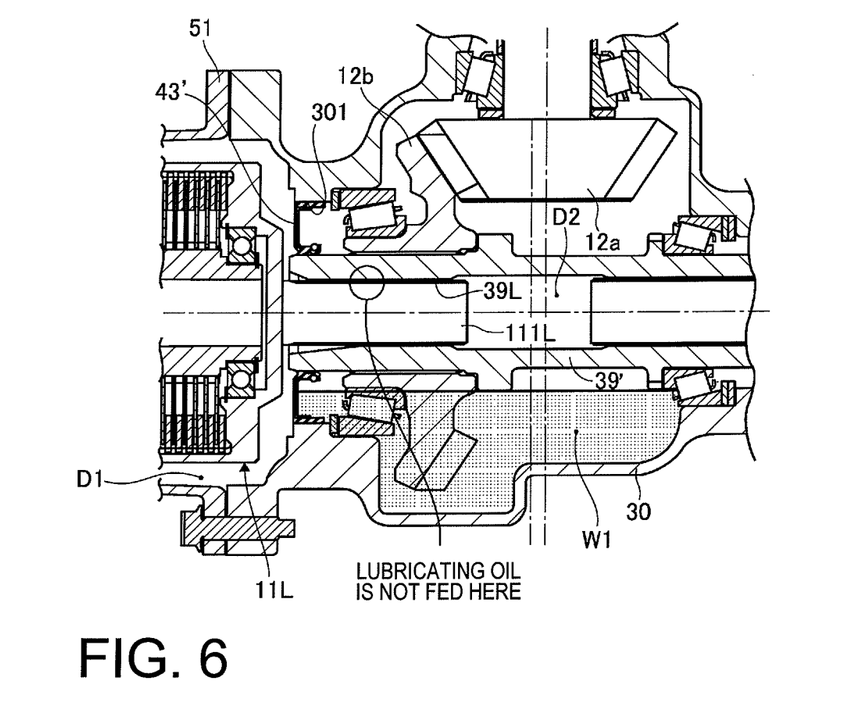
FIG. 6 is a partial enlarged cross-sectional view showing the area around the center shaft of the comparative example.

FIG. 6 is a partial enlarged cross-sectional view showing the area around the center shaft of the comparative example. The essential configuration of the comparative example is the same as the first embodiment, but the length of the center shaft 39' is different. The oil seal 43' is different in being disposed between the center section housing 3a and the external circumference of the center shaft 39'. In the case that the length of the center shaft 39' is great in the axial direction, as shown in the comparative example, it is difficult to dispose the oil seal between the center section rear housing 30, and the left rear wheel clutch 11L and the left rear wheel clutch 11L, in the case that the gap between the end part of the center shaft 39' and the left rear wheel clutch 11L is small. In this case, the oil seal 43' is disposed between the center section housing 3a and the center shaft 39', lubricating oil is not fed between the center shaft 39' and the left rear wheel clutch 11L, and the hollow portion of the center shaft 39' is constituted as a dry chamber D2. In this case, the lubricating oil cannot be fed to the meshing portion and it is difficult to inhibit abrasion or the like of the spline.

In contrast, the oil seal of the first embodiment has the oil seal 43 disposed between the center section housing 3a and the seating 11L1, which is integral with the left rear wheel clutch 11L and is integral with the coupling input shaft 111L, and lubrication in the spline inside the center shaft 39 can be ensured. In other words, reducing the length of the center shaft 39 allows the seating 11L1 (i.e., the area with which the oil seal can make contact on the clutch side rather than the center shaft side) to be formed and allows lubricating oil to be fed into the center shaft 39.

As described above, the following effects can be obtained in the first embodiment.

(1) The drive-force-distribution control device comprises an input hypoid gear 12a (input-side bevel gear) for inputting drive force from a power source; a center shaft 39 having an output hypoid gear 12b (output-side bevel gear) for meshing with the input hypoid gear 12a; a center section housing 3a (housing) capable of being divided in the radial direction of the output-side bevel gear and to which the output hypoid gear 12b and the center shaft 39 can be mounted from the radial direction; a bearing 31 or a bearing 32 (bearing) disposed at a first end of the center shaft 39; and a left-side shim 41 or a right-side shim 42 (shim member) inserted into a gap in the axial direction between the center section housing 3a and the bearing 31 or the bearing 32, wherein the axially endmost part on the first end side of the center shaft 39 is located further to the second end side than is the endmost part of the bearing 31, 32 at the first end side in the axial direction.

For example, in the case of the bearing 31, the endmost part (x1) in the axial direction at the left end side of the center shaft 39 is further to the right end side than the endmost part (y1) in the axial direction at the left end side of the bearing 31; and in the case of the bearing 32, the endmost part (x2) in the axial direction at the right end side of the center shaft 39 is further to the left end side than the endmost part (y2) in the axial direction at the right end side of the bearing 32.

Therefore, the left-side shim 41 or the right-side shim 42 can be mounted after the output hypoid gear 12b has been assembled in the center section housing 3a from the radial direction; the center shaft 39 is not required to be detached when the shim member is to be replaced, and assembly work can be considerably improved.

(2) The bearing is a bearing 31 disposed at the first end and is a bearing 32 disposed at the second end; and the axially endmost part on the second end side of the center shaft 39 is located further to the first end side than is the axially endmost part on the second end side of the bearing disposed at the second end. In other words, the positions of the outer ends of the bearings 31, 32 are disposed so as to be further outside than the center shaft 39, whereby the position of the center shaft 39 in the axial direction can be adjusted with greater precision in the bearings 31, 32.

(3) The drive-force-distribution control device comprises a left rear wheel clutch 11L (left-side clutch) for variably transmitting drive force from the center shaft 39 to the left-side drive wheels; and a right rear wheel clutch 11R (right-side clutch) for variably transmitting drive force from the center shaft 39 to the right-side drive wheels. Therefore, the drive force transmitted to the left and right can be independently controlled.

(4) The drive-force-distribution control device comprises shaft fitting parts 39L, 39R formed in the inner circumference at the two ends of the center shaft 39; coupling input shafts 111L, 111R (input shaft) for meshing with the shaft fitting parts 39L, 39R at the outer circumference, the coupling input shafts being extended from the left rear wheel clutch 11L or the right rear wheel clutch 11R to the center shaft 39 side in the axial direction; and oil seals 43, 44 (seal member) for providing a seal between the left rear wheel clutch 11L or the right rear wheel clutch 11R and a position of the center section housing 3a toward the left rear wheel clutch 11L or the right rear wheel clutch 11R relative to the bearings 31, 32. Therefore, it is possible to feed lubricating oil to the fitting parts in the shaft fitting parts 39L, 39R, and abrasion in the meshing portion or other adverse events can be inhibited.

(5) The bearings 31, 32 are tapered roller bearings. Therefore, the bearings have high functionality for positioning in the axial direction, and the precision of meshing between the input hypoid gear 12a and the output hypoid gear 12b can accordingly be increased.

A first embodiment is described above, but different configurations are also included in the present invention. For example, in the first embodiment, an example was described in which the present invention has been applied to a drive-force-distribution control device for distributing drive force to the rear wheel side of a four-wheel drive vehicle. However, the present invention may be applied to any configuration that has a bevel gear and in which a shim member is mounted in a structure that allows the bevel gear to be mounted in the housing from the axial direction. No limitation is imposed by a tapered roller bearing as the bearing; examples of possible applications include angular ball bearing or the like. In the first embodiment, a configuration was described in which a bearing and a shim are provided to both ends of the center shaft, but the configuration may have a shim provided to only one end.

The invention claimed is:

1. A drive force distribution control device comprising:
   an input-side bevel gear for inputting a drive force from a power source;
   a center shaft having an output-side bevel gear for meshing with the input-side bevel gear;
   a housing being divided in a radial direction of the output-side bevel gear, the output-side bevel gear and the center shaft being mounted to the housing;
   a bearing disposed at a first end of the center shaft; and
   a shim member disposed in a gap formed about a center longitudinal axis of the center shaft between the housing and the bearing;
   an axially endmost part of the first end of the center shaft being located closer to a second end of the center shaft than an axially endmost part of the bearing that faces away from the second end of the center shaft,
   the center shaft, the housing and the shim member being configured such that the shim member is removable in the radial direction from the gap without requiring removal of the center shaft from the housing.

2. The drive-force-distribution control device according to claim 1, further comprising
   a bearing disposed at the second end of the center shaft; and
   an axially endmost part on the second end of the center shaft being located closer to the first end of the center shaft than is an axially endmost part of the bearing that is disposed at the second end of the center shaft and that faces away from the first end of the center shaft.

3. The drive-force-distribution control device according to claim 1, wherein
   the bearing is a tapered roller bearing.

4. The drive-force-distribution control device according to claim 2, wherein
   the bearings are tapered roller bearings.

5. A drive-force-distribution control device comprising:
   an input-side bevel gear for inputting a drive force from a power source;
   a center shaft having an output-side bevel gear for meshing with the input-side bevel gear;
   a housing being divided in a radial direction of the output-side bevel gear, the output-side bevel gear and the center shaft being mounted to the housing;
   a bearing disposed at a first end of the center shaft;
   a shim member disposed in a gap formed in an axial direction of the center shaft between the housing and the bearing;
   an axially endmost part of the first end of the center shaft being located closer to a second end of the center shaft than is an axially endmost part of the bearing that faces away from the second end of the center shaft;
   a left-side clutch operatively coupled to the center shaft for variably transmitting the drive force from the center shaft to the left-side drive wheels; and
   a right-side clutch operatively coupled to the center shaft for variably transmitting the drive force from the center shaft to the right-side drive wheels.

6. The drive-force-distribution control device according to claim 5, further comprising
   a left-side shaft fitting part formed in an inner circumference at the first end of the center shaft;
   a right-side shaft fitting part formed in an inner circumference at the second end of the center shaft;

a left-side input shaft meshing with the left-side shaft fitting part at an outer circumference at the first end of the center shaft, the left-side input shaft extending from the left-side clutch to the center shaft in the axial direction;

a right-side input shaft meshing with the right-side shaft fitting part at an outer circumference at the second end of the center shaft, the right-side input shaft extending from the right-side clutch to the center shaft in the axial direction;

a left-side seal member forming a seal between the left-side clutch and a position of the housing closer to the clutch relative to the first end of the center shaft; and a right-side seal member forming a seal between the right-side clutch and a position of the housing closer to the right-side clutch relative to the second end of the center shaft.

7. The drive-force-distribution control device according to claim 6, wherein the bearings are tapered roller bearings.

8. The drive-force-distribution control device according to claim 5, wherein the bearings are tapered roller bearings.

9. A drive-force-distribution control device comprising:

an input-side bevel gear for inputting a drive force from a power source;

a center shaft having an output-side bevel gear for meshing with the input-side bevel gear;

a housing being divided in a radial direction of the output-side bevel gear, the output-side bevel gear and the center shaft being mounted to the housing;

a bearing disposed at a first end of the center shaft;

a shim member disposed in a gap formed in an axial direction of the center shaft between the housing and the bearing;

an axially endmost part of the first end of the center shaft being located closer to a second end of the center shaft than is an axially endmost part of the bearing that faces away from the second end of the center shaft;

a left-side clutch operatively coupled to the center shaft for variably transmitting the drive force from the center shaft to the left-side drive wheels; and a right-side clutch operatively coupled to the center shaft for variably transmitting the drive force from the center shaft to the right-side drive wheels.

10. The drive-force-distribution control device according to claim 9, further comprising a left-side shaft fitting part formed in an inner circumference at the first end of the center shaft;

a right-side shaft fitting part formed in an inner circumference at the second end of the center shaft;

a left-side input shaft meshing with the left-side shaft fitting part at an outer circumference at the first end of the center shaft, the left-side input shaft extending from the left-side clutch to the center shaft in the axial direction;

a right-side input shaft meshing with the right-side shaft fitting part at an outer circumference at the second end of the center shaft, the right-side input shaft extending from the right-side clutch to the center shaft in the axial direction;

a left-side seal member forming a seal between the left-side clutch and a position of the housing farther toward the clutch relative to the bearing on the first end of the center shaft; and a right-side seal member forming a seal between the right-side clutch and a position of the housing farther toward the right-side clutch relative to the bearing on the second end of the center shaft.

11. The drive-force-distribution control device according to claim 10, wherein the bearings are tapered roller bearings.

\* \* \* \* \*